April 15, 1924.

H. B. TAYLOR 1,490,297

HYDRAULIC TURBINE

Filed July 24, 1917    10 Sheets-Sheet 1

INVENTOR
H. Birchard Taylor
BY
Edwards, Sager & Richmond.
ATTORNEYS.

April 15, 1924.

H. B. TAYLOR 1,490,297

HYDRAULIC TURBINE

Filed July 24, 1917    10 Sheets-Sheet 2

INVENTOR
H. Birchard Taylor
BY
Edwards, Sager & Richmond
ATTORNEYS.

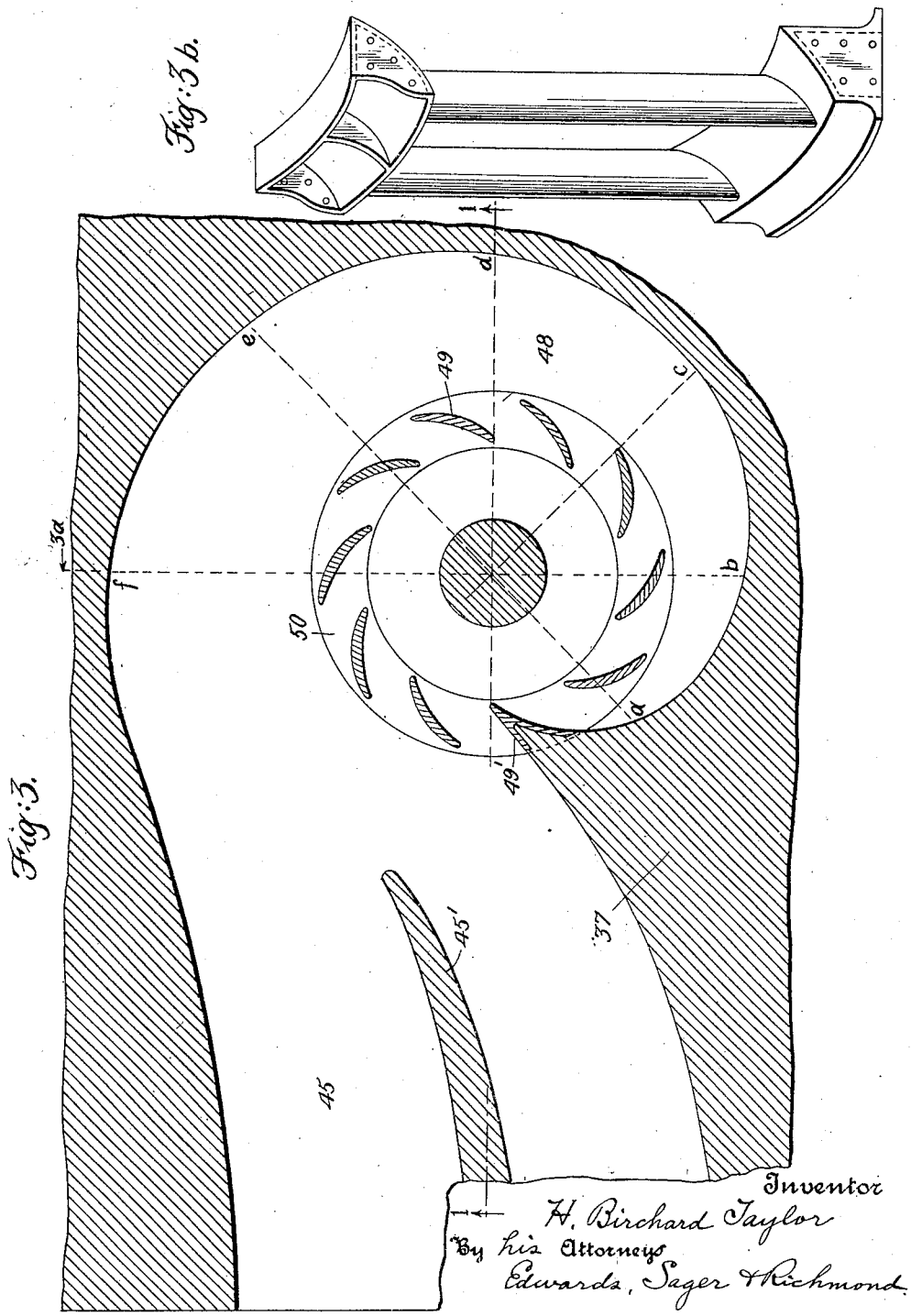

April 15, 1924.
H. B. TAYLOR
HYDRAULIC TURBINE
Filed July 24, 1917   10 Sheets-Sheet 4
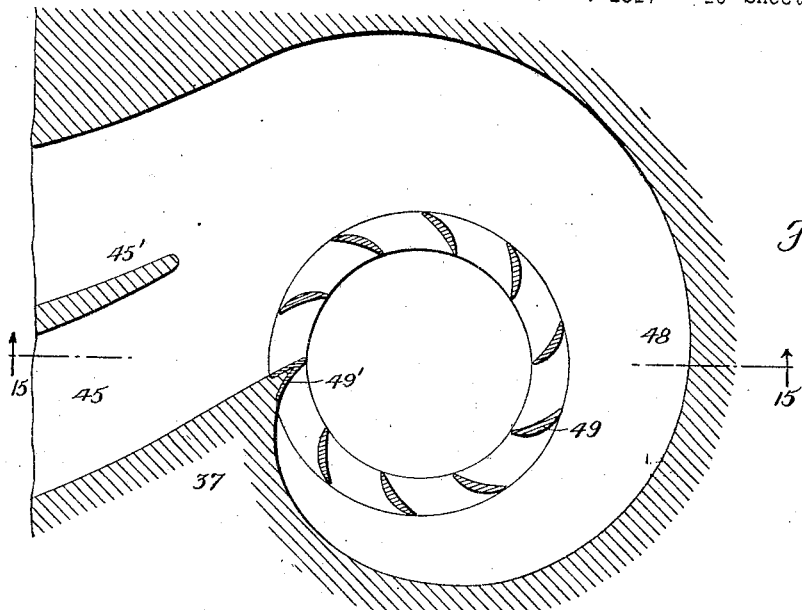
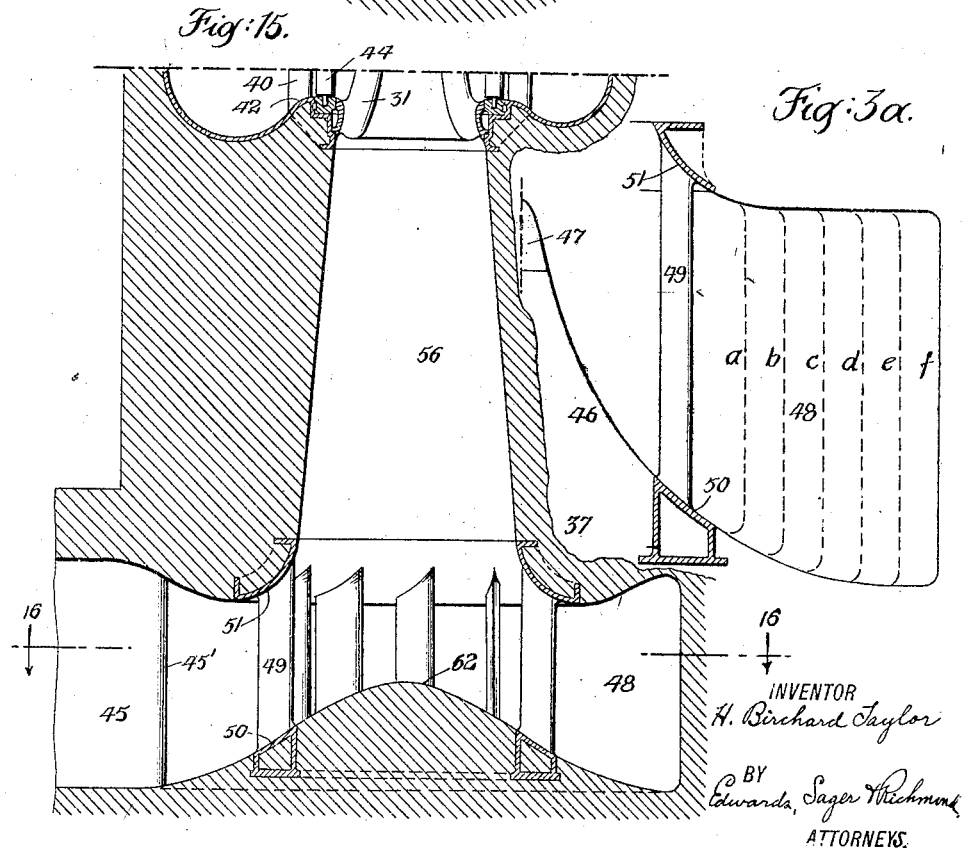

April 15, 1924.

H. B. TAYLOR

HYDRAULIC TURBINE

Filed July 24, 1917     10 Sheets-Sheet 5

1,490,297

Inventor
H. Birchard Taylor
By his Attorneys
Edwards, Sager & Richmond

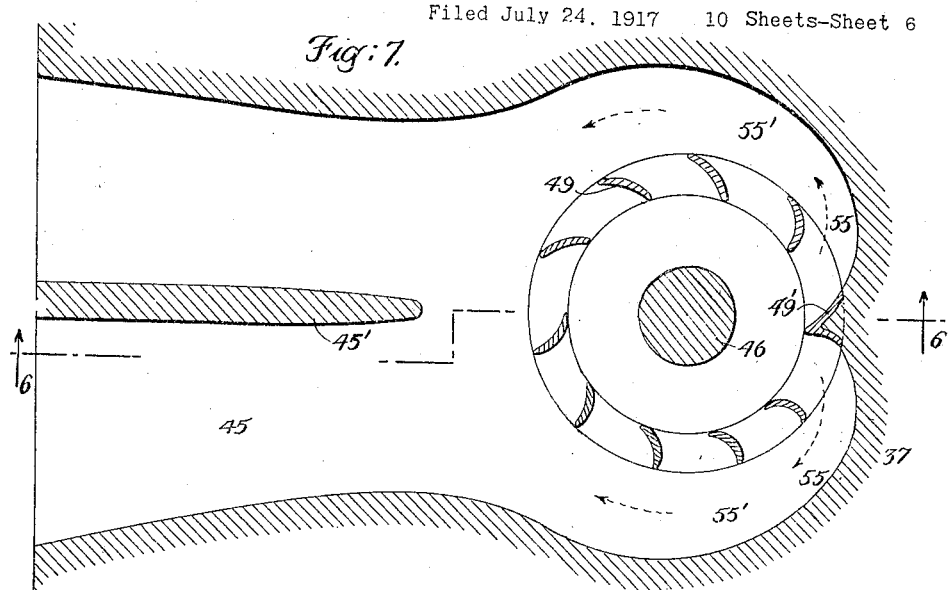
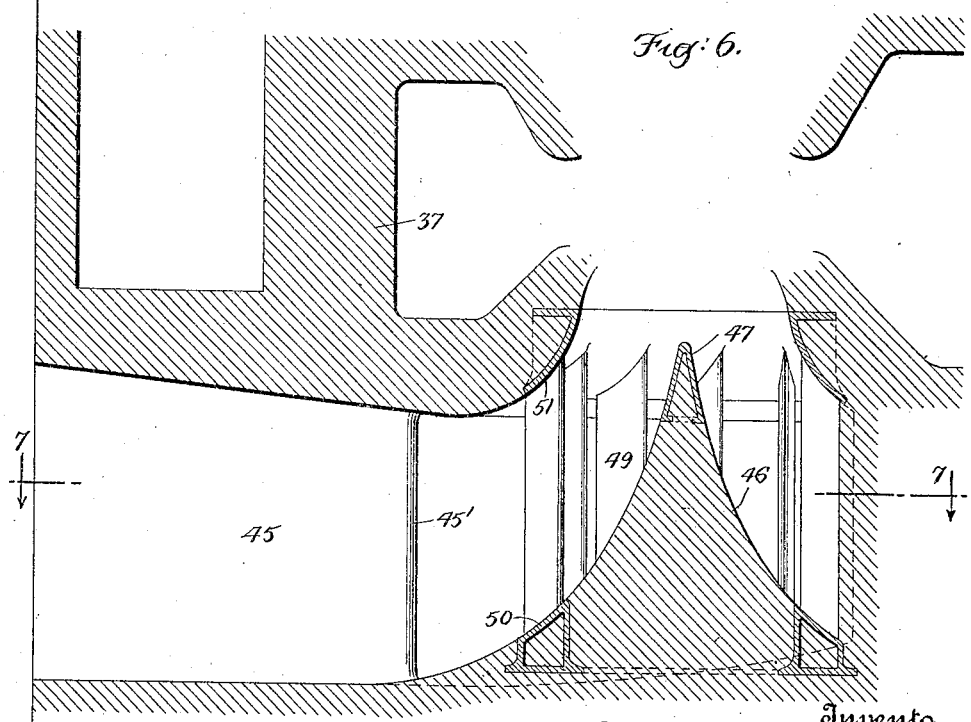

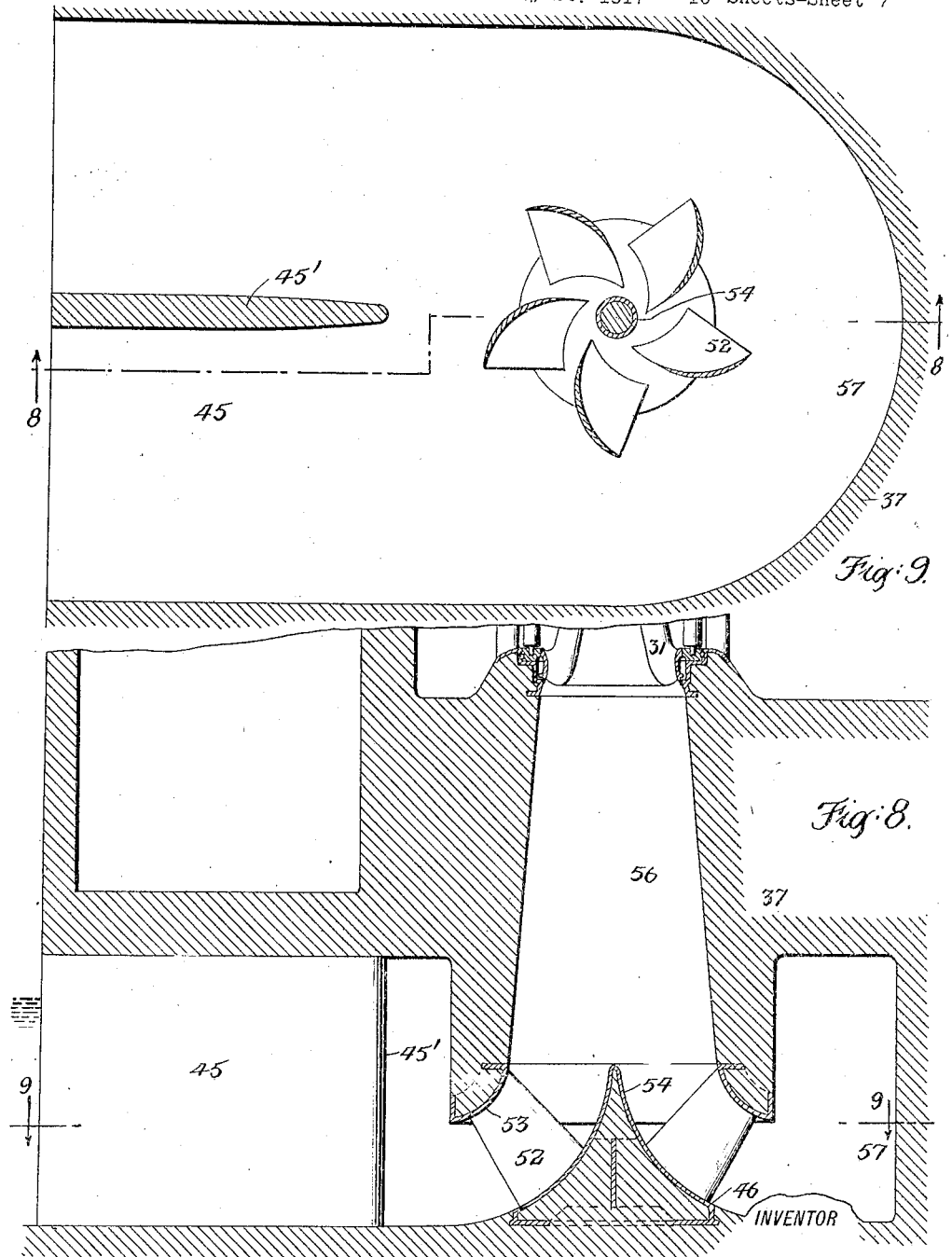

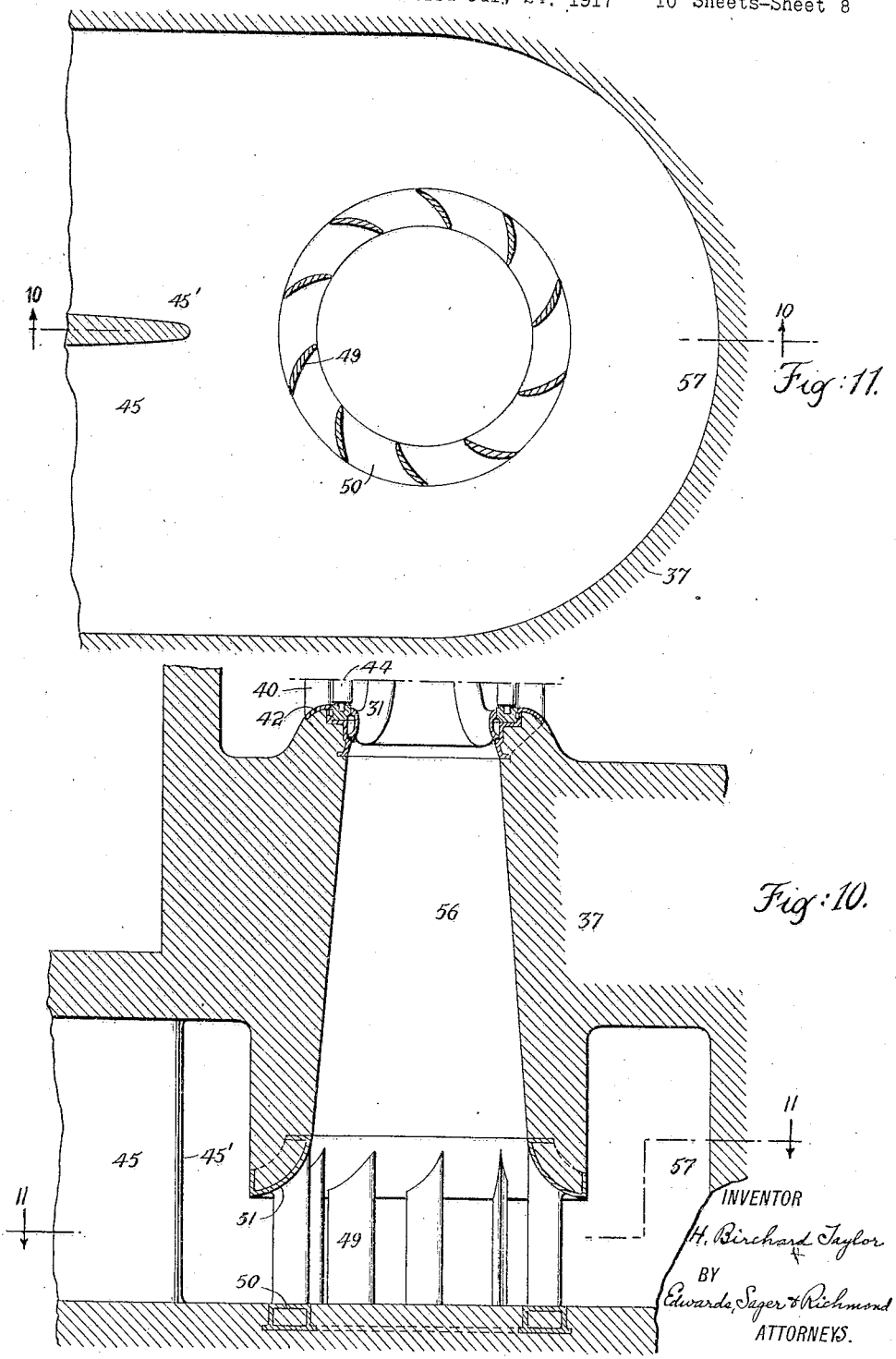

April 15, 1924.
H. B. TAYLOR
1,490,297
HYDRAULIC TURBINE
Filed July 24, 1917 10 Sheets-Sheet 9
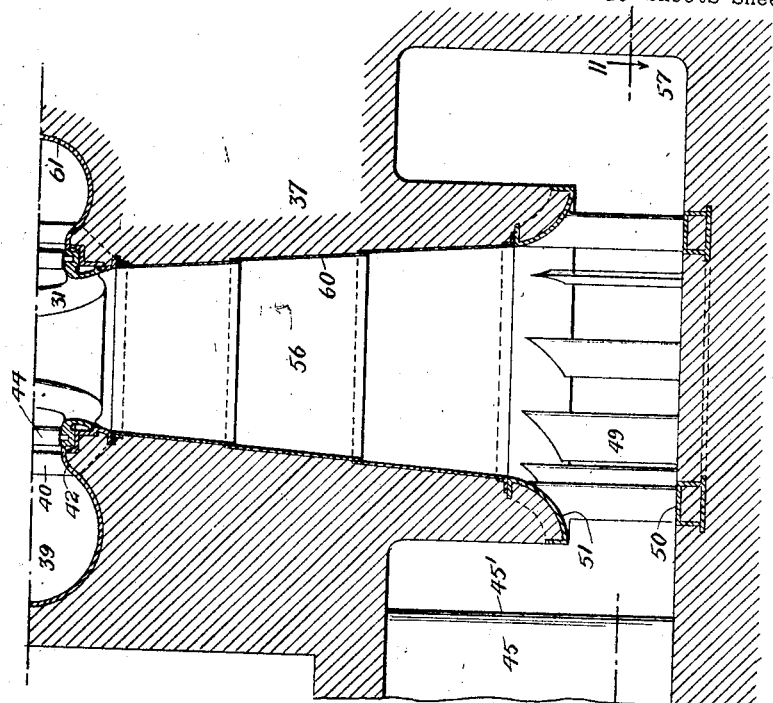
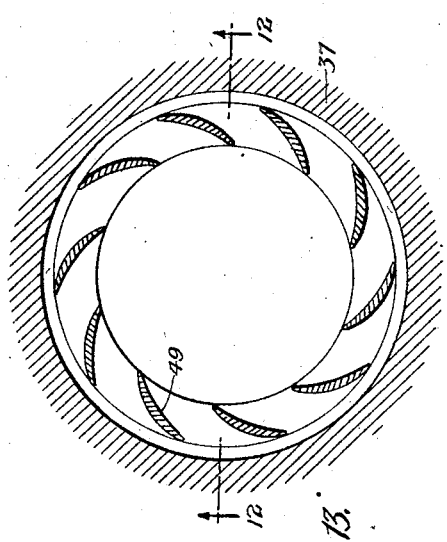
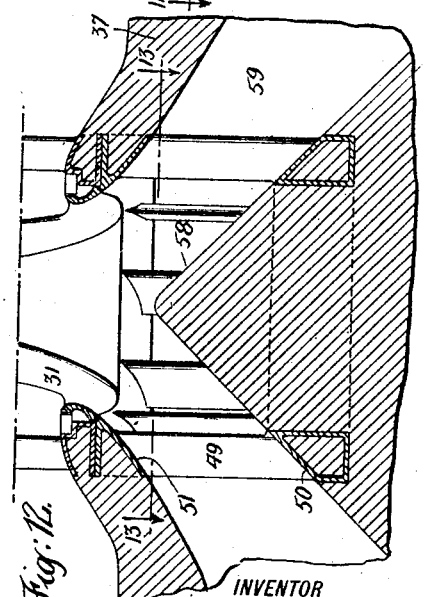
INVENTOR
H. Birchard Taylor
BY
Edwards, Sager & Richmond.
ATTORNEYS.

April 15, 1924.

H. B. TAYLOR

HYDRAULIC TURBINE

Filed July 24, 1917   10 Sheets-Sheet 10

1,490,297

INVENTOR
H. Birchard Taylor
BY
Edwards, Sager & Richmond
ATTORNEYS.

Patented Apr. 15, 1924.

1,490,297

UNITED STATES PATENT OFFICE.

HARVEY BIRCHARD TAYLOR, OF PHILADELPHIA, PENNSYLVANIA.

HYDRAULIC TURBINE.

Application filed July 24, 1917. Serial No. 182,498.

*To all whom it may concern:*

Be it known that I, HARVEY BIRCHARD TAYLOR, a citizen of the United States, residing at Philadelphia, in the county of Philadelphia and State of Pennsylvania, have invented certain new and useful Improvements in Hydraulic Turbines, of which the following is a specification.

The principal object of my invention is to provide a new and improved substructure for a hydraulic turbine of the inward flow type. A further object is to provide an improved conduit for receiving a whirling discharge from the runner and directing it downwardly and outwardly along a curved flaring path of constantly increasing radial distance from the turbine axis. Another object of my invention is to provide suitable supporting means for such a turbine and its associated masonry structure. Another object is to make a stay vane ring to go in the draft conduit of such a turbine. Still another object of my invention is to provide columns or piers in the draft conduit beneath such a turbine that shall be effective as supports for the superposed structure and at the same time have the proper disposition as vanes with respect to the water flow in the conduit. These and other objects of my invention will be made apparent in the following disclosure of a limited number of examples of forms in which the invention may be embodied. Following is a description which refers specifically to these respective modifications; it will be apparent that other modifications may be made that will embody the same inventive idea.

In the drawings,

Fig. 3 is another horizontal section taken on the line 3—3 of Fig. 1;

Figure 5:
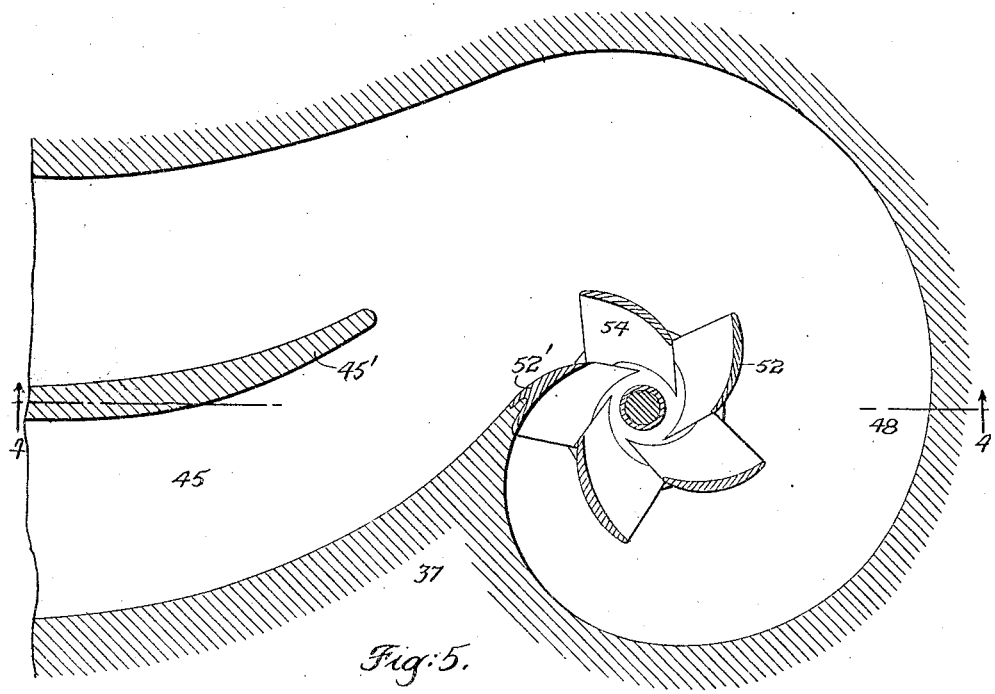
Figure 4:
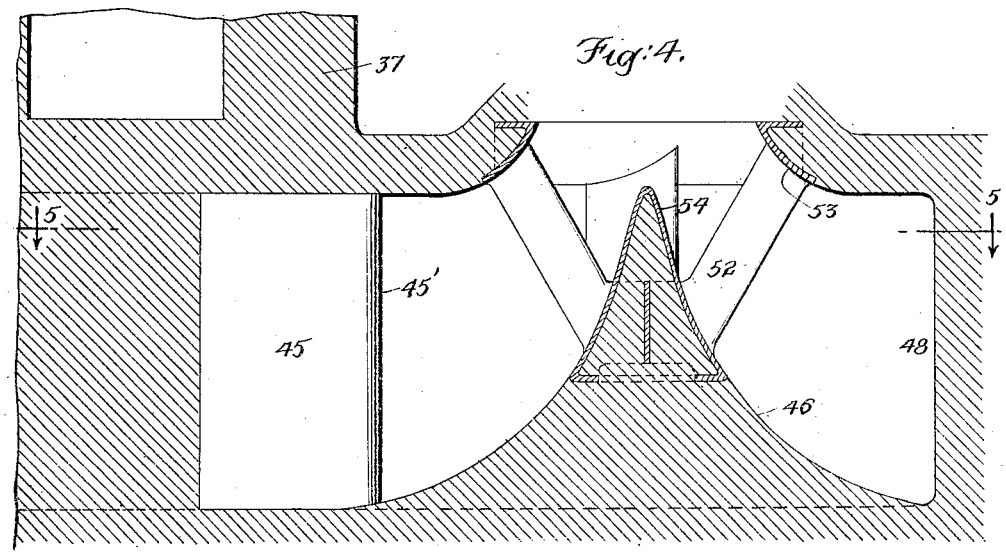
Figure 18:
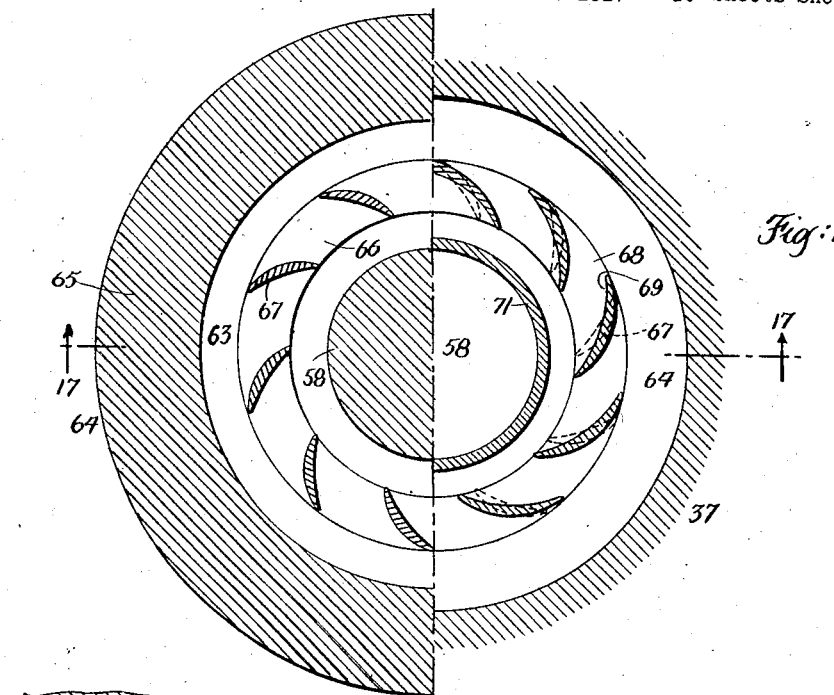
Figure 17:
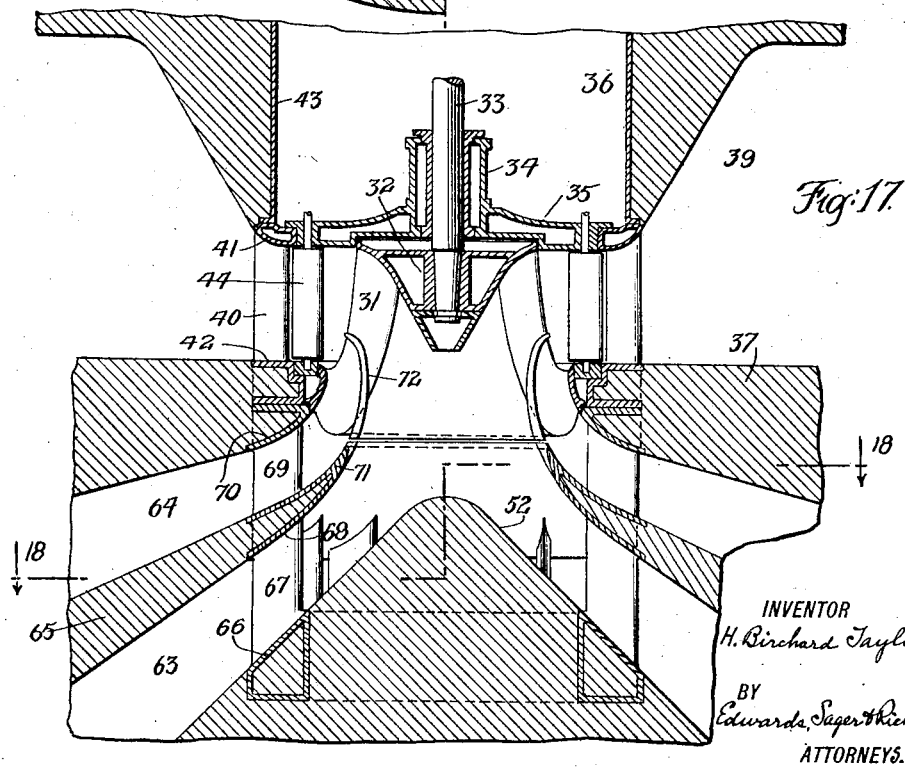

Fig. 3ª is a fragmental diagram corresponding to a section taken on the line 3ª—3ª of Fig. 3;

Fig. 3ᵇ is a perspective view of a detail modification;

Fig. 4 is a vertical axial section taken on the line 4—4 of Fig. 5 showing another embodiment of my invention;

Fig. 5 is a horizontal section taken on the line 5—5 of Fig. 4;

Fig. 6 is a vertical axial section of another embodiment of my invention taken on the line 6—6 of Fig. 7;

Fig. 7 is a horizontal section taken on the line 7—7 of Fig. 6;

Fig. 8 is a vertical axial section taken on the line 8—8 of Fig. 9 showing another form in which my invention may be embodied;

Fig. 9 is a horizontal section taken on the line 9—9 of Fig. 8;

Fig. 10 is a vertical axial section taken on the line 10—10 of Fig. 11 showing another modification of my invention;

Fig. 11 is a horizontal section taken on the line 11—11 of Fig. 10; Fig. 11 also represents a horizontal section on the line 11—11 of Fig. 14;

Fig. 12 is a vertical axial section showing another form in which my invention may be embodied and corresponding to the line 12—12 of Fig. 13;

Fig. 13 is a horizontal section taken on the line 13—13 of Fig. 12;

Fig. 14 is a vertical axial section of another modified form of my invention;

Fig. 15 is a vertical axial section of another modification embodying my invention; this section is taken on the line 15—15 of Fig. 16;

Fig. 16 is a horizontal section taken on the line 16—16 of Fig. 15;

Fig. 17 is a vertical axial section of another modification of my invention taken on the line 17—17 of Fig. 18, and Fig. 18 is a horizontal section taken on the line 18—18 of Fig. 17.

Figure 1:
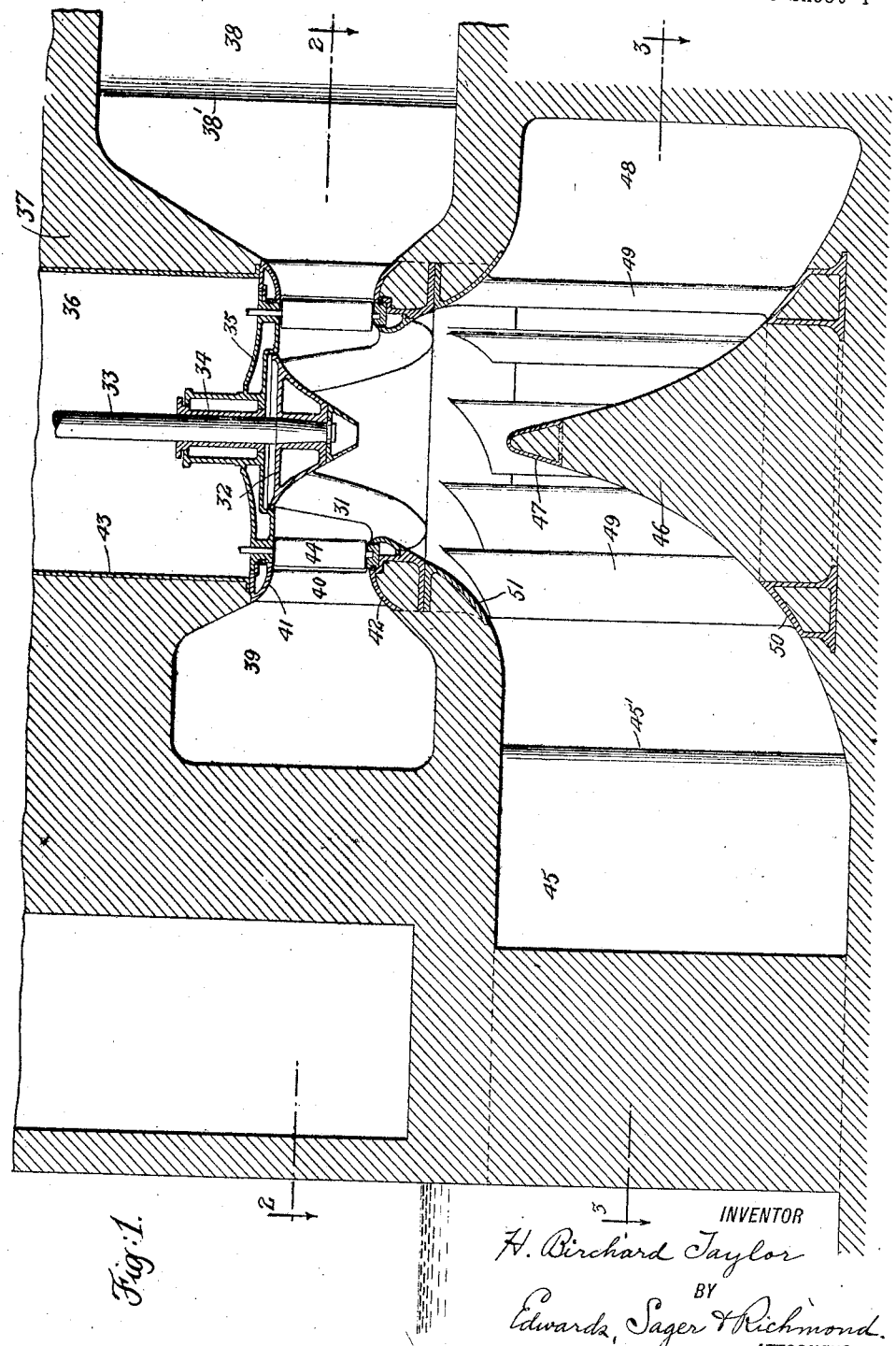
Fig. 1 is a vertical axial section taken on the line 1—1 of Figs. 2 and 3 showing one embodiment of my invention.
Figure 2:
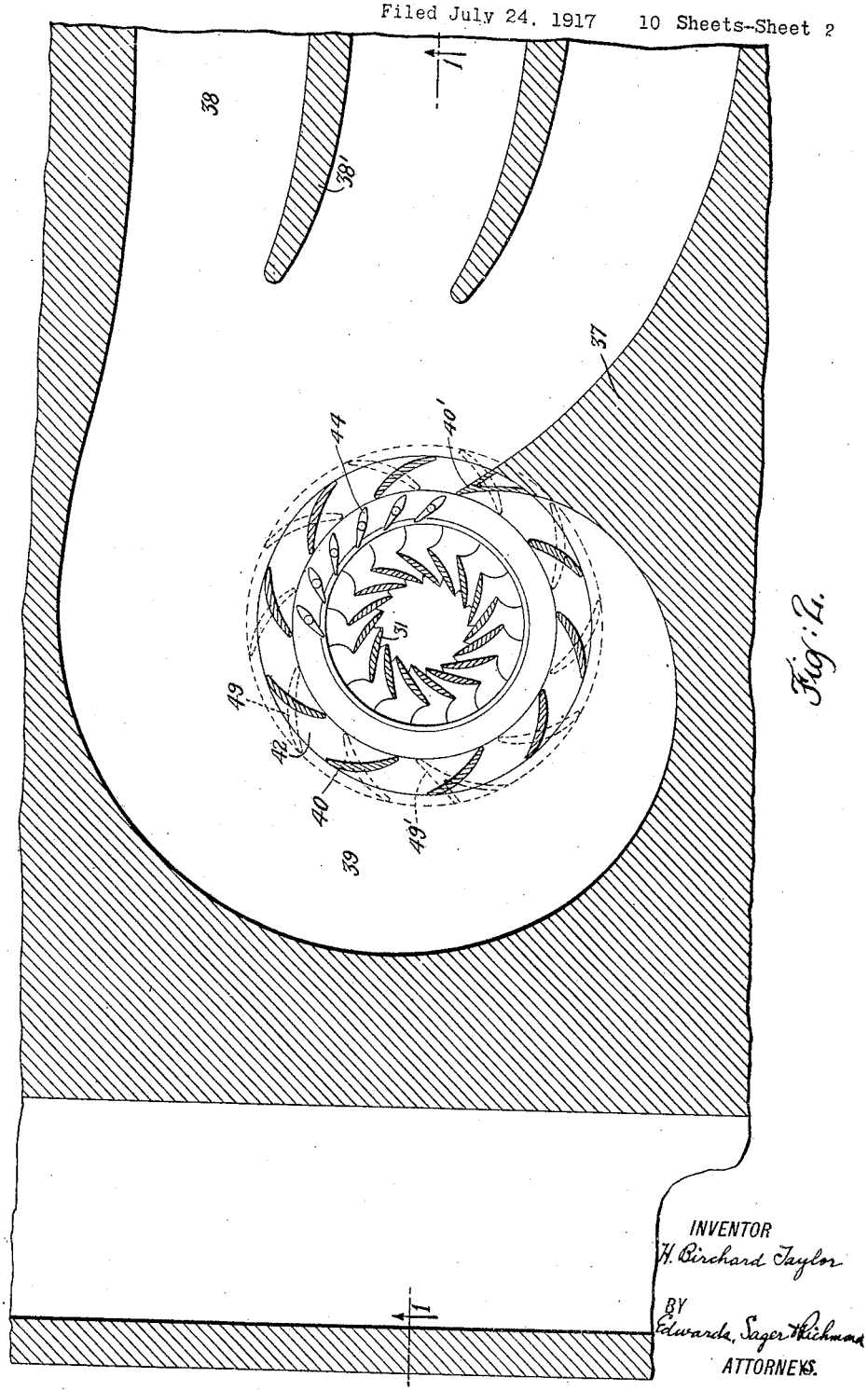
Fig. 2 is a horizontal section taken on the line 2—2 of Fig. 1.

The turbine runner 32, shown in Figs. 1 and 2, has the vanes 31 and is carried by the shaft 33 mounted in the lower bearing 34 which is supported by the head cover 35 in the lower end of the pit 36. This pit 36 is formed in the concrete structure 37, and also formed therein is the conduit 38 for the water that is supplied to the turbine runner. This conduit 38 has piers 38' which support the upper wall from the lower wall and are shaped efficiently to direct and distribute the flow of water as it approaches the guide vanes and runner. The supply conduit 38 terminates in a spiral or volute portion 39 surrounding the runner 32. A speed ring is provided, which consists of the iron speed ring vanes 40 cast integrally with the top and bottom rings 41 and 42. Thus the entire speed ring may be one casting or it may be cast in segments with one or more vanes 40 and the proximate portions of the upper and lower rings 41 and 42 in each casting.

The pit 36 has a metal lining 43 which is supported on the upper ring 41 of the speed ring. The periphery of the head cover 35 also rests on the crown 41 of the speed ring. The adjustable guide vanes 44 are pivotally mounted in the head cover around the runner 32. Within the adjustable guide vanes 44 is the runner space in which the flow passes to and through the runner 32 and down to the outflow conduit 45. This runner space extends downward below the guide vanes 44 and its lower portion is bounded by the inner exposed surface of the lower ring casting 42 of the speed vane ring formed by the upper and lower rings 41 and 42 and stay vanes 40. This speed vane ring 42 is supported from below by the crown ring 51 of the lower stay vanes 49.

Below the runner 32 formed in the concrete structure 37 is the outflow conduit 45 for the water discharged from the runner 32. The upper wall of this outflow conduit 45 is supported by a pier 45′ which is so disposed as most efficiently to direct and distribute the flow of water therethrough. The pier 45′ extends from the outlet of the draft tube passage to the outlet end of the outlet passage 45. The portion of the outflow conduit 45 directly beneath the runner 32 has a spiral or volute form at 48 bounded on the side toward the axis by the conical concrete wall 46 capped with the metal member 47 and bounded on the side away from the axis by a wall having its horizontal section in the shape of a spiral as shown in Fig. 3. Fig. 3ᵃ represents a section taken on the line 3ᵃ—3ᵃ in Fig. 3 with the outer wall shown at f. The dotted lines in Fig. 3ᵃ designated a, b, c, d, e, represent sections of this wall taken by planes containing the axis and designated on Fig. 3 by the corresponding letters.

The stay ring having the vanes 49, base ring 50, and crown ring 51 is placed in the discharge conduit as shown in the drawings. This stay ring is cast integrally or in segments and, in the latter case, each segment comprises one or more vanes 49 cast integrally with the proximate portions of the base ring 50 below and the crown ring 51. Fig. 3ᵇ shows the construction when the ring is cast in segments, one segment being shown in perspective; the parts on the crown and base rings with holes for the connecting bolts are apparent. The lower ring 42 of the speed ring rests on the upper ring 51 of the stay ring as shown in Fig. 1. Each ring 50 and 51 is embedded in the concrete 37 so that its surface is flush with the surface of the concrete and forms part of the inner face of the discharge conduit. The lower ring 50 has a wide surface to stand upon the concrete in which it is embedded and the vanes 49 act as piers or columns to support the upper ring 51 and the structure above the same. Thus it will be seen that the stay ring directly supports the speed ring and whatever weight is carried by the speed ring. Referring to Fig. 2, it will be noticed that the speed vanes 40 and the stay vanes 49 are respectively in vertical alinement so that the weight is transmitted directly downwardly through them. This disposition is not essential in all cases since the rings 42 and 51 may be made sufficiently strong to distribute the load.

The vanes 49 are inclined with respect to corresponding radii drawn to them from the axis of the turbine as shown in Fig. 3 and also by dotted lines in Fig. 2. It will be seen that the speed ring vanes 40 deliver the water to the runner with a certain amount of whirl and that the stay ring vanes 49 are inclined to conduct the water away with a whirl in the same direction; this is the same direction in which the runner rotates. One stay ring vane designated 49′ is made of special shape as shown in Fig. 3 so that it will connect with the concrete structure 37 and give a proper form to the volute chamber 48. In particular cases it may be advisable to make more than one vane of special shape, different from the rest.

It will be seen that the stay ring comprising the vanes 49, the base ring 50 and the crown ring 51, gives effective support to the concrete structure 37 where it overhangs the chamber 48, and also supports the turbine structure and its parts and through the speed ring supports the metal lining wall 43 of the pit 36 and the adjacent concrete structure 37, as well as other superposed parts, such as the generator and thrust bearing above the turbine, not shown in these views. The members 49 are not only vanes but they also function as piers or columns; they are made of cast iron thus obtaining a desirable degree of supporting strength without such excessive cross-section as to interfere objectionably with the flow of the water through them. The vanes together with the crown and base rings form a rigid structure capable of preventing any movement or distortion of the stationary portions of the turbine structure.

In the operation of the turbine the flow leaves the runner vanes 31 with a whirl in the direction of rotation of the runner and this whirling discharge passes down into the space below the runner in a substantially axial direction and is turned outward all around in the flaring annular passage between the outer and inner surfaces of revolution formed respectively by the ring 51 and the central conical core 46, 47. The cross sectional area of this passage increases continuously from the runner to the end of the stay vanes 49 where it discharges into the volute draft chamber 48; and this increase in cross sectional area affects a deceleration of the velocity of the discharge so as to reduce the back pressure on the runner 32. The outer wall formed by ring 51 is therefore a draft tube flaring downward and outward to a maximum at its outlet end where it discharges into the collection chamber 48 (Fig. 3) and 55, 55' (Fig. 7) surrounding the stay vane ring 49. The outwardly flaring form of this draft tube wall permits it to discharge into the space 48 within a short distance from the runner so that the draft tube is of comparatively short length; into it the central conical core 46 capped with the metal member 47 extends from below, that is from the direction of its flared outlet end, and the core 46 is disposed centrally in the draft tube and terminates close to the center of the runner. In the annular space between the draft tube wall 51 and the inner core 46, 47 the flow passing from the runner to the discharge space 48 is in the form of a hollow annular column around the central core 46 and expanding in cross sectional area in the direction of flow. The volute draft chamber 48 is so constructed as to receive the water discharged from the space leading from runner vanes 31 in its natural tangential direction and to guide the stream-elements together in a solid stream to enter the conduit 45. The cross-section taken across these stream-elements increases everywhere so as to decrease the velocity in the draft conduit. The successive cross-sections indicated by the lines $a$, $b$, $c$, $d$, $e$ and $f$ in Figs. 3 and 3ª increase in size more than enough to accommodate the increasing volume of water from the runner taken round its periphery from the point corresponding to the pier 49'. Hence the velocity of the water is slowed down in the chamber 48 as well as in the conduit 45. According to well-known laws of hydraulics, this reduction of velocity of the outflowing water creates a suction downwardly through the runner; otherwise stated, it reduces back pressure at the runner and so increases the net effective head on the runner. The stay vanes 49 are designed to assist in the hydraulic operation of gradually reducing the velocity of the water while flowing between the vanes. For this purpose they are suitably curved to receive the water in its natural direction of flow; and to provide a gradually increasing cross-sectional area, measured perpendicularly to the stream-elements between neighboring vanes. The pier 45' in addition to serving as a support from the upper wall of the conduit 45 as previously stated has the effect of separating the flow which has passed between the vanes 49 in a general down stream direction from the flow which has passed through the vanes in other directions. The latter flow has had its velocity decreased by being turned through the chamber 48 and this construction is designed to prevent the mixing of this slow moving flow with the more rapidly moving flow and thus avoid the formation of eddies and the consequent loss of energy.

In Figs. 4 and 5 the stay vanes are designated 52 and it will be seen that they incline divergently upwards and the upper ring 53 corresponds approximately with the ring 51 in Figs. 1, 2 and 3, but at the lower ends of the stay vanes 52 they are cast integrally with the cone 54 which caps the part 46 of the concrete structure 37. One of the stay vanes is slightly modified as at 52' adapting it to join with the concrete structure 37 to form the wall for the spiral chamber 48. Figs. 4 and 5 also differ from the previous arrangement in the number of stay vanes used. The number of vanes will vary in different installations and is not restricted to any particular number.

The modification shown in Figs. 6 and 7 differs from that of Figs. 1, 2 and 3 principally in the feature that instead of delivering the water in a single spiral chamber 48, it is gathered in two opposite spiral chambers 55, each of which receives the water from approximately 180° of the whole angular space around the axis of the runner. It will be seen that the two streams in the two chambers 55 are directed oppositely, as indicated by the dotted lines 55', but they unite in one stream in the conduit 45. There is one special pier at the beginning of the spiral conduit as in the other cases and this is designated 49', but it is to be noticed that the remaining piers or vanes 49 are not of the same shape because part of them must be adapted for a right-hand direction and the others for a left-hand direction. This difference in shape is apparent in Fig. 7.

In the modification disclosed in Figs. 8 and 9, directly below the runner there is an ordinary flaring draft tube with vertical axis, which is designated 56. Below this is the stay ring having the vanes 52, crown ring 53 and conical base 54 similar to the stay ring shown in Figs. 4 and 5. The chamber 57 around the stay ring is not spiral in this case but has the shape shown by the horizontal section in Fig. 9. In this modification no special design is embodied for absorbing the whirl component directly by means of a spiral conduit as in the modifications heretofore discussed. The chamber 57 simply receives the water after its available energy has been recovered and conducts it to the tailrace 45. Dependence is here placed on the vanes 52 for the recovery of the energy of whirl possessed by the water flowing in the tube 56. The vanes are formed to reduce all components of the velocity in the tube with as little loss of energy as possible.

The modification shown in Figs. 10 and 11 corresponds to that of Figs. 8 and 9, except that a stay ring with vertical vanes 49 is employed and the bottom of the chamber 57 is horizontal, without the conical member 46—54 shown in Fig. 8. As will be apparent from Fig. 10 the diameter of the draft tube 56 increases uniformly going downward until the level of the upper edge of the crown ring 51 is reached and then the diameter enlarges at an increasing rate for further positions below. Thus it is apparent that the draft tube shown in Fig. 10 flares increasingly as it approaches the bottom wall in which the base ring 50 is embedded.

In Figs. 12 and 13, the chamber 59 which receives the discharge water from the turbine runner has an annular shape around the conical deflector 58. Here a stay ring with vertical piers or vanes 49 is employed. The water discharging from the runner goes with decreasing velocity in the annular chamber 59 because its cross-section increases across the stream lines and so its energy is recovered by reducing the back pressure at the turbine runner.

In the embodiment of my invention disclosed in Fig. 14, the general design is much the same as for Figs. 10 and 11, but in Fig. 14 the draft tube 56 is formed not merely as a void in the concrete structure 37 but it has a sheet metal lining 60 which stands on the crown ring 51 of the stay ring. At its upper end this sheet metal draft tube lining 60 has a flange attached to the base ring 42 of the speed ring. In this embodiment of my invention I have also shown a metal turbine casing 61 for the supply water conduit 39, in place of the conduit formed in concrete used in preceding figures. The weight of the turbine and other parts is carried by the concrete surrounding the tube 56 to the stay ring and thence to the foundation. The plate steel lining serves merely as a form for setting the concrete and a liner for the tube, and is not essential as a part of the structure carrying the superposed load.

Figs. 15 and 16 show a construction in which the flaring draft tube 56 directly under the runner is employed, being in this respect like Figs. 8, 9, 10, 11 and 14, but below this flaring draft tube 56 is a spiral collector 48. The stay ring has the vertical vanes or piers 49 and performs the functions described in the earlier examples herein considered. The sprial collector 48 receives the water from the draft tube 56 and conducts it in its natural whirling direction into the conduit 45 and thence to the tailrace. The central conical projection 62 formed in the concrete structure 37 is provided in this case.

In the modification disclosed in Figs. 17 and 18, two annular draft chambers 63 and 64 are provided separated by a wall 65 which is part of the concrete structure 37. The stay ring is formed to correspond to this double draft chamber and has the base ring 66, lower vanes 67, intermediate ring 68, upper vanes 69 and crown 70. The intermediate ring 68 is extended inwardly toward the runner at 71 so as to divide the water as it leaves the runner and to separate it into two parts to enter respectively the annular chambers 63 and 64. The runner may carry a partition 72 between the vanes 31 in registry with the partition 71 so that the division of the water into two parts is made as the water enters the runner. The two sets of stay vanes 67 and 69 are differently formed in order to conform to the different degrees of whirl in the water discharged from the outer and inner portions of the runner. The variation in shape is shown in Fig. 18, in which the portion to the left of the axis shows a horizontal section through the lower vanes, and the right-hand portion a section through the upper set of vanes.

The subject matter of some of the modifications not specifically claimed herein is claimed in copending divisional applications filed as follows: Serial Number 557,921 filed May 2, 1922; Serial No. 562,970, filed May 23, 1922; Serial No. 563,811 filed May 26, 1922; Serial No. 663,952 filed September 21, 1923.

I claim:—

1. In a hydraulic turbine the combination with a runner having a substantially axial discharge, of a draft tube therefor comprising an outer wall formed as a surface of revolution flaring outwardly away from the axis, a central conical core member having its surface similarly flared and its apex out of supporting contact with the hub of said runner, said core and walls forming between them an annular passage radially flaring from a central axis in lines adapted to maintain the flow in annular column formation around said core while changing its direction and decelerating its velocity, and a chamber surrounding the outlet of said annular passage through substantially 360° and receiving the flow therefrom.

2. In a hydraulic turbine the combination with a runner having a substantially axial discharge, of a draft tube therefor comprising an outer wall formed as a surface of revolution flaring outwardly away from the axis, and a central conical core member having its surface similarly flared and its apex out of supporting contact with the hub of said runner, said core and walls forming between them an annular passage radially flaring from the central axis in lines adapted to maintain the flow in annular column formation around said core while changing its direction and decelerating its velocity, and a chamber surrounding the outlet of said annular passage through substantially 360° and receiving the flow therefrom, said chamber having a side wall curving eccentrically with relation to the turbine axis.

3. In a hydraulic turbine the combination with a runner having a substantially axial discharge, of a draft tube therefor comprising an outer wall formed as a surface of revolution flaring outwardly away from the axis, and a central conical core member having its surface similarly flared and its apex out of supporting contact with the hub of said runner, said core and walls forming between them an annular passage radially flaring from the central axis in lines adapted to maintain the flow in annular column formation around said core while changing its direction and decelerating its velocity, and a chamber surrounding the outlet of said annular passage through substantially 360° and receiving the flow therefrom, said chamber having a side wall curving eccentrically with relation to the turbine axis to guide the outflow toward tail water.

4. In a hydraulic turbine the combination with a runner having a substantially axial discharge, of a draft tube therefor comprising an outer wall formed as a surface of revolution flaring outwardly away from the axis, and a central conical core member having its surface similarly flared and its apex out of supporting contact with the hub of said runner, said core and walls forming between them a radially flaring annular passage with a linear width and cross section increasing in the direction of flow and maintaining the flow in annular column formation around said core while changing its direction and decelerating its velocity, and a chamber surrounding the outlet of said annular passage through substantially 360° and receiving the flow therefrom.

5. In a hydraulic turbine the combination with a runner having a substantially axial discharge, of a draft tube therefor comprising an outer wall formed as a surface of revolution flaring outwardly away from the axis, and a central conical core member having its surface similarly flared and its apex out of supporting contact with the hub of said runner, said core and walls forming between them an annular passage radially flaring from the central axis in lines adapted to maintain the flow in annular column formation around said core while changing its direction and decelerating its velocity, and a chamber surrounding the outlet of said annular passage through substantially 360° and receiving the flow therefrom, said chamber having a side wall curving eccentrically with relation to the turbine axis and having a substantially vertical entrance edge positioned in said annular passage.

6. In combination a turbine runner, a masonry structure around the turbine axis and having an outflow conduit formed therein and a series of metal stay vanes in said conduit arranged in a series which surrounds the runner axis and stays opposite walls of the conduit rigidly together, each such stay vane having small thickness transverse to the direction of flow and being set at a suitable angle to a plane through the vane and containing the turbine axis, so as to offer small resistance to the outflowing water.

7. In combination a turbine runner having a vertical axis, a masonry structure around the runner axis and having an outflow conduit formed therein and a series of metal stay vanes in said conduit arranged in a series which surrounds the runner axis and stays upper and lower walls of the conduit rigidly together, each such stay vane having small thickness transverse to the direction of flow and being set at a suitable angle to a plane through the vane and containing the runner axis so as to offer small resistance to the outflowing water.

8. In combination, a turbine runner with vertical axis, a masonry foundation structure around the runner axis having an outflow conduit formed therein and a circular series of metal stay vanes in said conduit surrounding said vertical axis and supporting the upper wall of said conduit on the lower wall thereof, said vanes being shaped in conformity with expanding spiral paths of flow of the water.

9. In combination, a turbine runner with vertical axis, a masonry foundation structure around the runner axis having an outflow conduit formed therein and metal stay vanes in said conduit arranged in a series which surrounds the runner axis and supports the upper wall of said conduit on the lower wall thereof, said stay vanes being similarly inclined to radii thereto from said axis.

10. In combination, a turbine runner with vertical axis, a masonry foundation structure around the runner axis having an outflow conduit formed therein and metal stay vanes in said conduit arranged in a series which surrounds said axis and supports the upper wall of said conduit on the lower wall thereof, each said stay vane being oblique to radii thereto from said axis so that said stay vanes stand edgewise to discharge water flowing with a whirl component of velocity from the turbine.

11. In combination, a turbine runner with vertical axis, a masonry foundation structure below the runner having an outflow conduit formed therein, a series of metal stay vanes in said conduit arranged in a series which surrounds said vertical axis and supporting the upper wall of said conduit on the lower wall thereof, and metal members at the upper and lower ends of said vanes respectively in engagement with said masonry structure and serving as thrust abutments for said vanes.

12. In combination, a turbine runner with vertical axis, a masonry foundation structure below the runner having an outflow conduit formed therein and a stay vane ring in said conduit around said vertical axis, said stay vane ring comprising vanes and abutments integral with the vanes and respectively in engagement with the upper and lower walls of said conduit.

13. In combination, a turbine runner with vertical axis, a masonry foundation structure below the runner having an outflow conduit formed therein and a stay vane ring in said conduit around said vertical axis, said stay vane ring comprising metal vanes and abutments cast integral therewith, said abutments being respectively in engagement with the upper and lower walls of said conduit and said vanes serving as struts between said abutments.

14. In combination, a turbine runner with vertical axis, a masonry foundation structure below the runner having an outflow conduit formed therein, a speed ring around the runner, and a stay vane ring in said outflow conduit around said vertical axis, said stay vane ring comprising vanes and abutments therefor in engagement respectively with the upper and lower walls of said outflow conduit, the upper abutment being approximately directly beneath said speed ring.

15. In combination, a turbine runner with vertical axis, a masonry structure around and below said runner with an inflow conduit formed therein around the runner and an outflow conduit formed therein below the runner, a stay vane ring in the outflow conduit around said axis supporting the weight of the upper wall and the superposed structure upon the lower wall of said conduit, and a speed ring in said inflow conduit around the runner approximately directly above said stay vane ring and supported thereby and in turn supporting the upper wall of the inflow conduit and the structure superposed thereon.

16. In combination, a turbine runner with vertical axis, a masonry foundation structure below the runner having an outflow conduit formed therein, said conduit spreading downwardly and outwardly around said axis on every side, and metal stay vanes in said conduit arranged in a series which surrounds the runner axis and supports the upper wall of said conduit on the lower wall thereof, each such stay vane having small thickness transverse to the direction of flow and being set at a suitable angle to a plane through the vane containing the turbine axis, so as to offer small resistance to the outflowing water.

17. In combination, a turbine runner with vertical axis, a masonry foundation structure below the runner having an outflow conduit formed therein and a circular series of separate stay vane members in said conduit surrounding the axis of the runner, each stay vane member comprising at least one vane with base and crown abutments integral therewith engaging the upper and lower walls of said outflow conduit respectively.

18. In combination, a turbine runner with vertical axis, a masonry foundation structure below the runner having an outflow conduit formed therein and a stay vane ring in said conduit around said vertical axis, said stay vane ring comprising vanes and abutments integral with the vanes and respectively in engagement with the upper and lower walls of said conduit, said abutments having their inner surfaces flush with the inner surfaces of said walls with which they are in engagement.

19. In combination, a turbine runner with vertical axis, an inflow conduit around the runner, an outflow conduit below the runner, and a structure around the axis of the turbine comprising a circular row of speed vanes in the inflow conduit around the runner and a circular row of stay vanes in the outflow conduit below the speed vanes.

20. In combination, a turbine runner with vertical axis, a masonry foundation structure below the runner having an outflow conduit formed therein and a segmental stay vane ring in said conduit, each segment comprising at least one vane and base and crown abutments integral therewith engaging the lower and upper walls of said outflow conduit respectively, said base and crown abutments being fastened to like members adjacent thereto to form a complete stay vane ring.

21. In combination, a turbine runner with vertical axis, a masonry foundation structure below the runner having a spiral outflow conduit formed therein and metal stay vanes in said conduit arranged in a series which surrounds said axis and supports the upper wall of said conduit on the lower wall thereof, each such stay vane shaped in conformity with spiral paths of flow of the water.

22. In combination, a turbine runner with vertical axis, a masonry foundation structure below the runner having an outflow conduit formed therein and bounded on its lower and inner side by an upward conical projection of the lower wall of said conduit coaxial with the runner, and metal stay vanes in said conduit arranged in a series which surrounds said axis and supports the upper wall of said conduit on the lower wall thereof.

23. In combination, a turbine runner with vertical axis, a masonry foundation structure below the runner having a spiral outflow conduit formed therein and bounded on its lower and inner side by an upward conical projection of the lower wall of said conduit coaxial with the runner, and a series of metal stay vanes in said conduit arranged in a series which surrounds said vertical axis and supporting the upper wall of said conduit on the lower wall thereof, one of said vanes being specially formed as part of the wall of the spiral conduit where said wall is nearest to the axis.

24. In combination, a turbine runner with vertical axis, a masonry foundation structure below the runner having an outflow conduit formed therein, the lower wall of said conduit projecting upward conically toward the runner and coaxial therewith, and metal stay vanes in said conduit arranged in a series which surrounds the runner axis and supports the upper wall or said conduit on the lower wall thereof.

25. In combination, a turbine runner with vertical axis, a masonry foundation structure below the runner having an outflow conduit formed therein, a speed ring around the runner, and a stay vane ring in said outflow conduit around said vertical axis, said speed ring having its base standing on the crown of said stay vane ring.

26. In combination, a turbine runner with vertical axis, a masonry foundation structure below the runner having an outflow conduit formed therein, a speed ring around the runner comprising speed vanes and a crown and a base ring, and a stay vane ring in said outflow conduit around said vertical axis comprising stay vanes and base ring engaging the lower wall of the outflow conduit and a crown ring with the base ring of the speed vane ring standing on the crown ring of the said stay vane ring.

27. In combination, a turbine runner with vertical axis, a masonry foundation structure below the runner having a draft conduit formed therein leading from the runner, said masonry structure comprising a base below said draft conduit and said draft conduit discharging laterally adjacent to said base, and a series of metal stay vanes standing on said base around the axis with their upper ends engaging the masonry structure around said draft conduit.

28. In combination, a turbine runner with vertical axis, a masonry foundation structure below the runner having a conical diffusion chamber formed therein, and a stay vane ring with its base engaging the lower wall of said diffusion chamber and its crown engaging and supporting the upper wall thereof.

29. In combination, a turbine runner with vertical axis, a masonry foundation structure below the runner having a downwardly diverging conical diffusion chamber formed therein, a stay vane ring in said chamber with its base engaging the lower conical wall and its crown engaging and supporting the upper wall around the runner and a speed ring around the runner with its base standing on the crown of said stay vane ring.

30. In combination, a turbine runner with vertical axis, a masonry foundation structure below the runner having an outflow conduit formed therein, a speed vane ring around the runner and a stay vane ring in said outflow conduit around said vertical axis, the speed vane ring standing on the said stay vane ring and the vanes of the two rings being respectively in approximately vertical registry.

31. In combination, a turbine runner with vertical axis, a masonry foundation structure below the runner having a draft conduit formed therein leading from the runner, said draft conduit being of expanding cross-section across the lines of flow, said masonry structure comprising a base below said draft conduit and said draft conduit discharging laterally adjacent to said base, and a series of metal stay vanes standing on said base around the axis with their upper ends engaging the masonry structure around said draft conduit.

32. In a hydraulic turbine the combination with a runner having a vertical shaft, of an inflow conduit leading the flow inward to said runner and an outflow conduit leading the discharge outward, and a continuous columnar support surrounding said runner and comprising rings of stay vanes one above the other in said conduits and adapted to support the turbine structure from the foundation below the lower conduit.

33. In a hydraulic turbine the combination with a runner, of an inflow conduit leading the flow inward toward said axis, and an outflow conduit leading the discharge outward away from said axis and a structure surrounding said runner and comprising a ring of stay vanes in each of said conduits adapted to stay the stationary parts of the turbine rigidly together.

34. In combination, a turbine runner, a structure on the discharge side of said runner having an outflow conduit with walls spaced to gradually decelerate the discharge and formed as surfaces of revolution around the runner axis and leading the discharge outward away from said axis, and stay vanes between said walls arranged in a series around said axis.

35. In combination, a turbine runner, a structure on the discharge side of said runner having an outflow conduit with walls spaced to gradually decelerate the discharge and formed as surfaces of revolution around the runner axis and leading the discharge outward away from said axis, and stay vanes between said walls arranged in a series around said axis, each stay vane being oblique to radii thereto from said axis so that said stay vanes stand edgewise to discharge water flowing with a whirl component of velocity from the turbine.

36. In a hydraulic turbine a draft tube comprising walls spaced apart and formed as surfaces of revolution adapted to guide the discharge away from the runner axis and a series of vanes receiving the water in its natural direction of flow and providing a gradually increasing cross sectional area measured perpendicularly to the stream elements between neighboring vanes.

37. In a turbine means for receiving water axially from the runner and delivering the same substantially radially in different directions, means for receiving the water so delivered and discharging it in one direction said latter means being formed to maintain the water received in one direction separate from the water received in a different direction.

38. In a turbine means for receiving water axially from the runner and delivering it substantially radially in different directions in planes perpendicular to the axis, means for receiving the water so delivered in said planes, said means being formed so as to maintain the water received in one direction separate from the water received in a different direction.

39. In a turbine a spiral collector adapted to receive a radial flow and deliver the same in substantially one direction, said collector being formed with means to prevent the mingling of parallel streams of different velocities.

40. In a turbine a radially spreading draft tube and a collector adapted to receive the flow from said tube, said collector being of progressively increasing area so as to produce a deceleration of the flow therethrough and being provided with a partition to prevent the mingling therein of streams of different velocities.

41. A discharge conduit for a turbine comprising a draft tube passage conducting the flow downward from the runner and extending outward at its lower end to form the top of an outlet passage leading to tail water, a floor wall for said outlet passage, and a vertical supporting pier member between said floor wall and said top wall and extending from the outlet of said draft tube passage to the outlet end of said outlet passage.

42. In a hydraulic turbine the combination with a runner having a vertical shaft of an inflow conduit leading the flow inward to said runner and an outflow conduit leading the discharge outward and a columnar support comprising stay vanes one above the other in said conduits and adapted to support the turbine structure from the foundation below the lower conduit.

HARVEY BIRCHARD TAYLOR.